United States Patent [19]
Case et al.

[11] 3,958,079
[45] May 18, 1976

[54] REAL TIME, TV-BASED, POINT-IMAGE QUANTIZER AND SORTER

[75] Inventors: Arthur L. Case; Jackson B. Davidson, both of Oak Ridge, Tenn.

[73] Assignee: The United States of America as represented by the United States Energy Research and Development Administration, Washington, D.C.

[22] Filed: Apr. 25, 1975

[21] Appl. No.: 571,443

[52] U.S. Cl.................................. 178/6.8; 178/6; 178/DIG. 36
[51] Int. Cl.²..................... H04N 7/18; G06M 11/02
[58] Field of Search................... 178/6, 6.8, DIG. 36

[56] References Cited
UNITED STATES PATENTS

| | | | |
|---|---|---|---|
| 3,551,052 | 12/1970 | Reiber | 356/51 |
| 3,740,468 | 6/1973 | Gardner | 178/6.8 |
| 3,780,223 | 12/1973 | Perry | 178/6.8 |
| 3,814,845 | 6/1974 | Hurlbrink et al. | 178/6.8 |

*Primary Examiner*—Benedict V. Safourek
*Assistant Examiner*—Edward L. Coles
*Attorney, Agent, or Firm*—Dean E. Carlson; David S. Zachry; David E. Breeden

[57] ABSTRACT

A device is provided for improving the vertical resolution in a television-based, two-dimensional readout for radiation detection systems such as are used to determine the location of light or nuclear radiation impinging a target area viewed by a television camera, where it is desired to store the data indicative of the centroid location of such images. In the example embodiment, impinging nuclear radiation detected in the form of a scintillation occurring in a crystal is stored as a charge image on a television camera tube target. The target is scanned in a raster and the image position is stored according to a corresponding vertical scan number and horizontal position number along the scan. To determine the centroid location of an image that may overlap a number of horizontal scan lines along the vertical axis of the raster, digital logic circuits are provided with at least four series-connected shift registers, each having 512 bit positions according to a selected 512 horizontal increment of resolutions along a scan line. The registers are shifted by clock pulses at a rate of 512 pulses per scan line. When an image or portion thereof is detected along a scan, its horizontal center location is determined and the present front bit is set in the first shift register and shifted through the registers one at a time for each horizontal scan. Each register is compared bit-by-bit with the preceding register to detect coincident set bit positions until the last scan line detecting a portion of the image is determined. Depending on the number of shift registers through which the first detection of the image is shifted, circuitry is provided to store the vertical center position of the event according to the number of shift registers through which the first detection of the event is shifted. Interpolation circuitry is provided to determine if the event centroid is between adjacent scan lines and stored in a vertical address accordingly. The horizontal location of the event is stored in a separate address memory.

4 Claims, 5 Drawing Figures

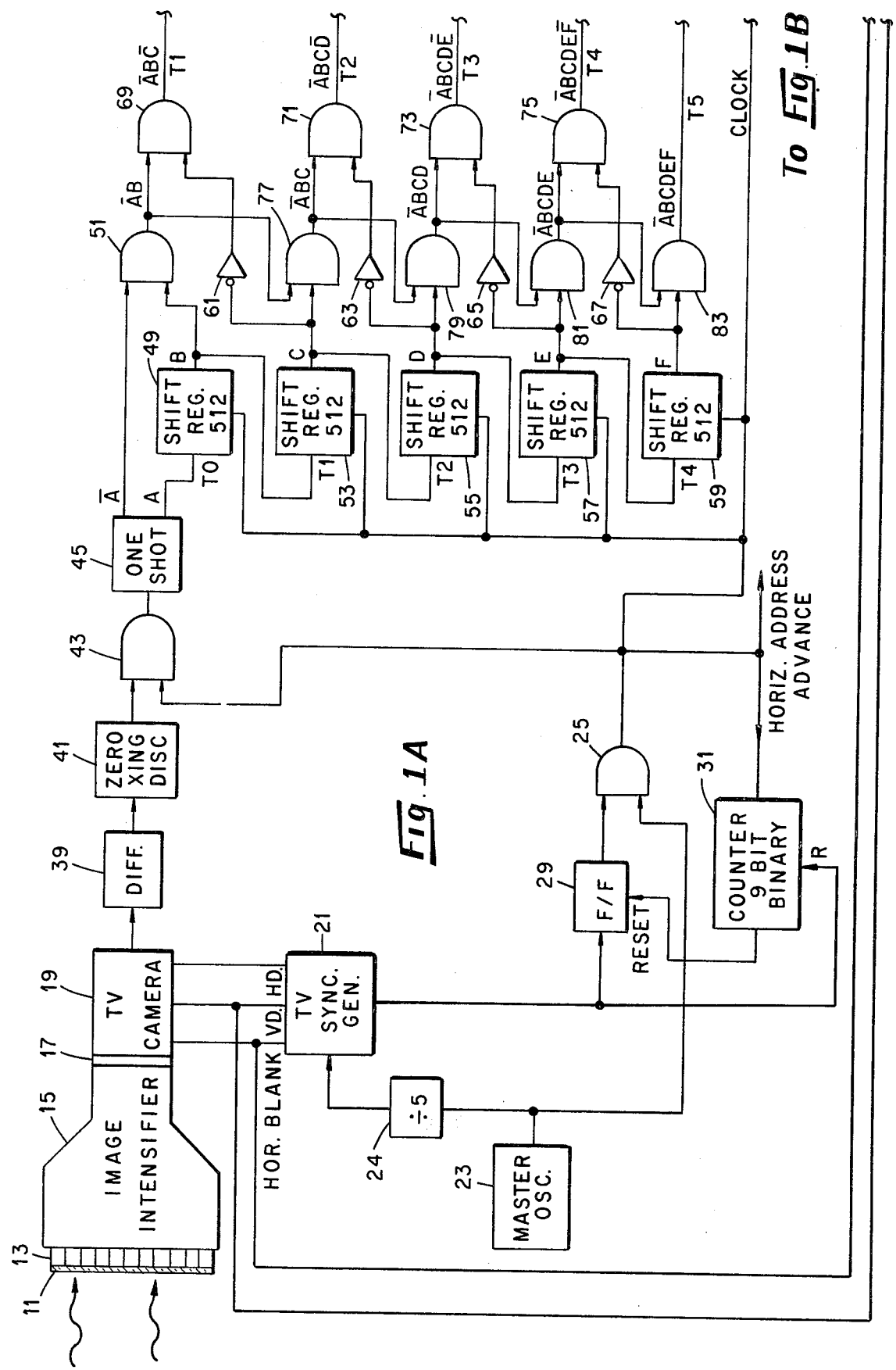

Fig. 2

CAMERA TARGET
HORIZONTAL PICTURE ELEMENT

EVENT 1: $A\bar{B}\bar{C}$
EVENT 2: $\bar{A}BC\bar{D}$
EVENT 3: $\bar{A}BCD\bar{E}$
EVENT 4: $\bar{A}BCDE\bar{F}$
EVENT 5: $\bar{A}BCDEF$ 3,958,079

REAL TIME, TV-BASED, POINT-IMAGE QUANTIZER AND SORTER

BACKGROUND OF THE INVENTION

This invention was made during the course of, or under, a contract with the Energy Research and Development Administration.

This invention relates generally to two-dimensional radiation detecting devices, and more specifically to improvements in the vertical resolution of a television-based, two-dimensional, position-sensitive system.

In the art of spatial radiation detection, conventional television techniques have been applied various forms to record the position of various radiation events directed upon a target area of a television camera tube. The television camera tube is an excellent means for obtaining high scanning rates to prevent the loss of events which occur between scan times for other conventional mechanical or similar scanners which have been used in two-dimensional detection. Television scanning systems are not only employed in detecting nuclear radiation, but may be employed in other disciplines, such as in astronomy, for viewing the night sky to record the position of various light sources viewed by a television camera. In most nuclear radiation detection applications for spatial detection, it is the practice to use a light transducer, such as a scintillator crystal, to provide a light image which the television camera views in order to determine the position of the radiation event; therefore, this invention will be illustrated with reference to the detection of nuclear radiation with the use of a scintillator crystal transducer. It will be obvious that this system may be used to provide readout for various other forms of radiation.

Such a system typically includes a continuous two-dimensional phosphor screen which converts impinging particles into scintillations. The screen is optically coupled to the face of a television camera tube in order that the scintillations may be stored temporarily as charge spots on a television camera tube target. The original position of the scintillations is maintained by this process. The television tube target is scanned in a raster. As the scanning beam encounters the stored charge spots, it is amplitude modulated sufficiently so that the spots may be recognized as pulses of current and stored according to their times of occurrence after the beginning of the scan. The scanning wipes the target clean and leaves it ready to accept other events. By holding the events until they can be recorded in an orderly and reproducible way, the two-dimensional spatial data is converted into a one-dimensional time distribution of current pulses. The current pulses may then be stored in a memory device by means of an address register that is maintained in synchronization with the scanning.

In the above television system, the vertical resolution, assuming the scanning is done horizontally, is fixed by the number of scan lines. The problem with this system, which has been overcome by the present invention, is that events which generate charge spots on the camera tube that overlap two or more scan lines are recorded more than one time. Even if the event is stored in a memory channel corresponding to the first line on which it is detected, the registered position of the particle or quantum may be in error. It is the centroid of the image which gives its true position rather than an edge. Since the size of the images can vary, the centroid may occur vertically on the first line detecting the event image or any one of several subsequent lines. It may also occur between any two scan lines. Systems without the improvements of the subject device often detect the edge or some intermediate point and as a result have a lower quality resolution.

SUMMARY OF THE INVENTION

In view of the above, it is an object of this invention to provide a readout system for use with a television-based, two-dimensional radiation detection system in which the vertical resolution for location of the centroid of an event image is improved due to more accurate location of the vertical center of the image.

Another object of this invention is to provide a readout system for use with a television-based, two-dimensional radiation detection system which prevents large images from being counted more than once.

Yet another object of this invention is to provide a readout system which attains the above objects and is further characterized by the ability to accurately monitor images of a wide range of sizes.

Other objects and many of the attendant advantages of the present invention will be apparent from the following detailed description of the invention taken in conjunction with the drawings.

BRIEF DESCRIPTION OF THE DRAWINGS

FIG. 2 is a representative drawing of a portion of the target of a television-based, two-dimensional, position-sensitive detector showing various detected events of different size.

DETAILED DESCRIPTION

Figure 1B:
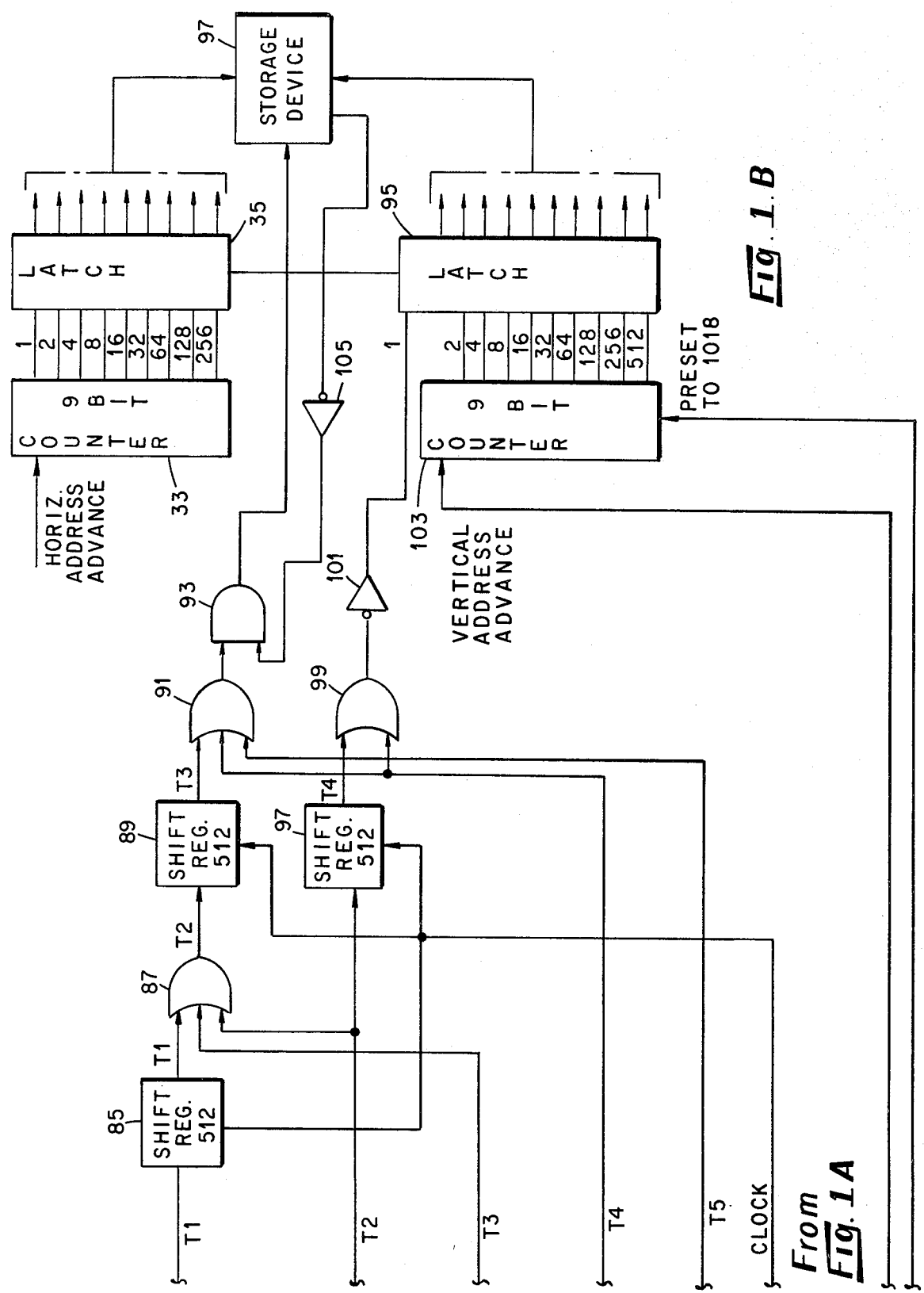
FIG. 1, consisting of FIGS. 1A and 1B, is a block diagram of an improved television-based detection system according to the present invention.

Referring now to FIG. 1, there is shown a two-dimensional, television-based radiation detection system for use in detecting nuclear radiation which impinges a conventional crystal scintillator 11. The scintillator 11 is optically coupled by means of optically transmissive fiber rods 13 to an image intensifier 15 which is in turn optically coupled by fiber rods 17 to the photo cathode of the target screen of a television camera 19. The television camera 19 is controlled for scanning by a conventional television synchronous generator 21, which requires a clock pulse rate of 2.0475 MHz. A master oscillator 23 is provided which produces pulses at a frequency of 10.2375 MHz, corresponding to 512 pulses per horizontal scan time. This requires a divide-by-five counter 24 between the master oscillator 23 and the clock input of the sync generator 21. It will be understood that different rates may be used by changing the master oscillator frequency, and thus a different increment of resolution along the horizontal scan. The master oscillator 23 pulses are supplied to an AND gate 25 which prevents the application of clock pulses from master oscillator 23 to the readout system during horizontal or vertical blanking. A timing pulse from the synchronous generator 21, which is activated just prior to each horizontal scan, is connected to the set input of a flip-flop 29 which has its set output connected to a separate input of AND gate 25. When flip-flop 29 is set, AND gate 25 is enabled to pass the master oscillator pulses to a counter 31, which has a reset input connected to the timing pulse output of generator 21. Counter 31 is a 9-bit binary counter which upon receiving 512 input pulses provides an overflow pulse to the reset input of flip-flop 29. The 512 counts correspond to the 512 increments of resolution along the horizontal scan. These same increments or clock pulses from AND gate 25 are fed to the count input of a horizontal address counter 33 and further provide synchronous shifting of various shift registers, as will be described. Counter 33 is also a 9-bit binary counter which has an output from each stage connected to a horizontal address latch 35. As will be more clearly described hereinbelow, the horizontal address is advanced one count for each resolution pulse and the occurrence of a radiation event detected along the scan is recorded at the particular count at which the latch is activated to store the binary number representing these horizontal increments.

Referring back to the television camera 19, it will be seen that the output of the television camera is connected directly to the input of a differentiator 39. The derivative of the video pulse from an event image along the scan provides a bipolar pulse whose zero crossing point coincides with the center location of the event along the horizontal scan. The zero crossing is detected by zero crossing discriminator 41 connected to the output of differentiator 39. The output of discriminator 41 is connected to one input of an AND gate 43 which has a separate input connected to the output of AND gate 25. Recalling the function of AND gate 25 this connection to AND gate 43 disables AND gate 43 from passing information during the vertical or horizontal blanking periods. The output of AND gate 43 is connected to the input of a one-shot 45. One-shot 45 has separate outputs A and $\overline{A}$. When the one-shot is set the A output goes "high" and the $\overline{A}$ output goes "low," and vice versa when the one-shot turns off. The A output of one-shot 45 is connected to the input of a 512-bit shift register 49. Signal A going "high" sets the front bit of shift register 49. Register 49 acts as a delay by shifting the bit through the shift register 49 by means of clock pulses from clock pulse generator 37 connected to shift input thereof. The $\overline{A}$ output of one-shot 45, termed the prompt scan signal, is compared with the shift register 49 output in an AND gate 51. The shift register 49 and the AND gate 51 comprises a first one of a series of comparison circuits for comparing the readout of adjacent scan lines to determine coincident detection of event images which overlap at least one scan line. To detect an event image overlapping more than two lines, additional comparison circuits are provided which include a plurality of additional 512-bit shift registers 53, 55, 57, and 59, connected in series with shift register 49. The vertical extent of the image is determined by delaying this information through the shift registers, one horizontal scan time delay for each register, and comparing it with subsequent prompt scan line information. Although only five shift registers are shown and described, it will be understood that the series may be expanded to fit a particular need using similar comparison logic, as will now be described.

Each shift register has a shift input which is triggered by clock pulses from the master oscillator 23 through AND gate 25. The output of each shift register with exception of the first register of the series, shift register 49, is connected through corresponding inverters 61 through 67 to separate inputs of corresponding AND gates 69 through 75. As long as there are no pulses present or an image does not overlap a scan line, the inverter outputs remain at the high level keeping AND gates 69 through 75 enabled. The outputs of shift registers 53 through 59 are also connected to separate inputs of corresponding AND gates 77 through 83. These AND gates compare the outputs of the shift registers to detect coincidence of image detection for images which overlap a plurality of scan lines by first connecting the output of AND gate 51 to a separate input of AND gate 77 and correspondingly connecting the separate inputs of each of the remaining AND gates 79 through 83 to the output of the preceding comparison gate.

The output of AND gate 69 is connected to the input of an additional 512-bit shift register 85 (FIG. 1B) whose output is connected to one input of a three-input OR gate 87. OR gate 87 has its second input connected to the output of AND gate 71 and its third input connected to the output of AND gate 73. The output of OR gate 87 is connected to the input of another 512-bit shift register 89. If an image does not overlap adjacent scan lines it will be recorded at the end of three scans following shifting of the image bit through shift registers 49, 85, and 89. Thus, the output of shift register 89 is connected to one input of an OR gate 91 whose output is connected to one input of an AND gate 93. The output of AND gate 93 is connected to the actuating input of the horizontal address latch 35 and the vertical address latch 95 to trigger the transfer of the registered horizontal and vertical addresses of the event image to a storage device 97 which is also connected to receive the output of gate 93 at an actuating input thereof.

To provide proper delay of the first image bit for an image which overlaps two adjacent scan lines, and to allow proper addressing, the output of AND gate 71 is connected to another 512-bit shift register 97. The output of shift register 97 is connected to one input of an OR gate 99. The purpose of OR gate 99 is to check for image centroids which fall directly between adjacent scan lines, and, when this is detected, the output of OR gate 99 goes high and disables the $2_0$ input of vertical address latch 95 acting through an inverter 101 connected between the output of OR gate 99 and the $2_0$ input of latch 95. Therefore, the second input of OR gate 99 is connected to the output of AND gate 75 which is also connected to the separate input of OR gate 91 to trigger the transfer of the address to the storage device 97 when the output of AND gate 75 goes "high." To complete the readout logic circuit, the output of AND gate 83 is also connected to the separate input of OR gate 91 for the same purpose.

Referring again to the television synchronous generator 21, it will be noted that the horizontal blanking output thereof is connected to the count input of a vertical address counter 103 and the vertical drive output of generator 21 is connected to a preset input of the vertical address counter 103. The vertical address counter 103 is also a 9-bit binary counter but differs from the arrangement for the horizontal address counter in that the first bit is connected to the second or the $2_1$ bit input of the vertical address latch 95. Thus, each pulse to the count input of counter 103 advances the vertical address count by 2. The counter 103 is arranged so that a vertical drive pulse to a preset input presets the counter to 1018 for a purpose as will be described hereinbelow. The output of the vertical address latch 95 is a 10-bit binary address which is accepted by the storage device 97 to store the vertical address of an event image while the horizontal address latch 35 is a 9-bit binary number indicative of the horizontal address which is connected to a separate input of storage device 97. Thus, the trigger signal to the latches 35 and 95 and the storage device 97 from gate 93 causes both the horizontal and vertical addresses to be stored at the proper time, indicative of the image centroid location. This signal triggers the address of the centroid to be stored if the memory or storage device 97 is not busy as indicated by gate 93 being enabled through inverter 105 connected between storage device 97 and a second input of AND gate 93. When gate 93 initiates a storage cycle, the storage device 97 presents a high signal to inverter 105 whose output disables gate 93 preventing the outputs of latches 35 and 95 being changed during the storage cycle.

Figure 3:
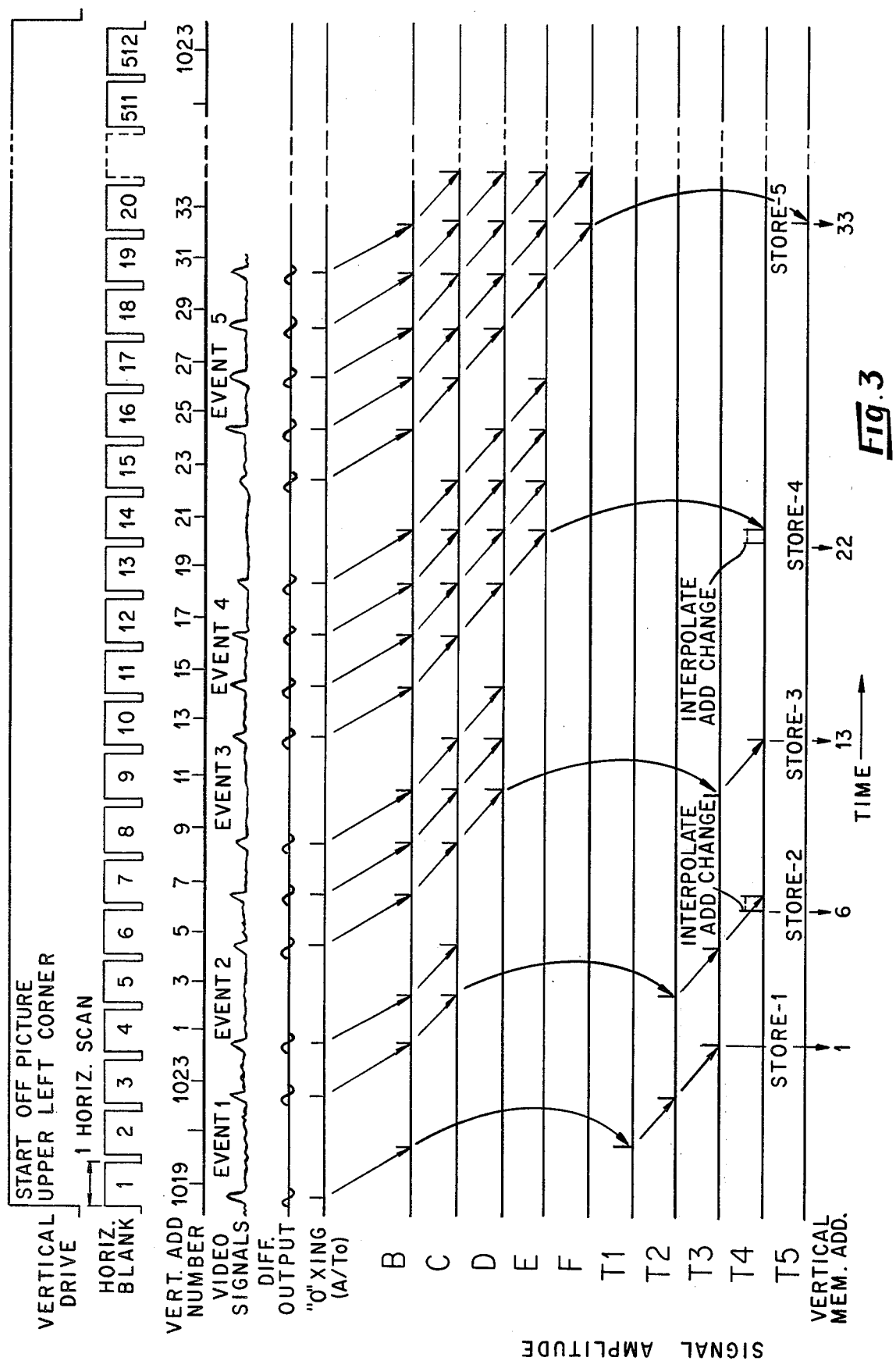
FIG. 3 is a timing diagram of the signals at various points in the diagram of FIG. 1 for the recording of events as shown in FIG. 2.

In order to more clearly illustrate the operation of the device, storage of the address for two examples of the five events shown in FIG. 2 will be discussed with reference to the timing diagram of FIG. 3. The detection of events, such as the events 1 through 5 in FIG. 2, from ionizing radiation striking the phosphor screen 11, for example, causes scintillations in the screen which are focussed as charged spots upon the target of the camera tube 19 at locations corresponding to the location of the event in the screen 11. An image may be illustrated, as event 1 of FIG. 2, which is seen to fall directly on scan line No. 1 and remains there until it is cleared by the scanning electron beam of the camera. As shown in the timing diagram of FIG. 3, the scanning begins at the upper left hand corner of the television camera target where the vertical drive signal goes high beginning a scanning cycle. Coincidence between the vertical drive signal and the horizontal blanking signal initiates the first horizontal scan.

To prepare the readout system for storing the event on scan 1, the master oscillator 23 is started and sends pulses to the synchronous generator 21 and to the AND gate 25. Just prior to when vertical drive signal goes "high," the timing pulse from generator 21 sets flip-flop 29 and resets counter 31. The setting of flip-flop 29 enables AND gate 25 to pass the master oscillator 23 pulses which are occurring at 512 pulses per scan. The first pulse through AND gate 25 sets the horizontal address counter 33 to 1, that is, the output to latch 35 would indicate increment No. 1 along the horizontal scan. Each clock pulse following will advance the horizontal address counter 33 until 512 counts are registered indicating the end of a horizontal scan. The end of the scan is indicated by the 9-bit counter 31 which overflows to reset flip-flop 29 upon receiving 512 clock pulses.

The vertical address counter 103 is initially preset to the count 1018 by the vertical drive signal which goes "high" at the start of the picture and remains "high" until the raster scan is completed. The vertical address counter 103 is advanced by a count of 2 each time the horizontal drive pulse goes "low," i.e., at the end of each horizontal scan. Thus, the vertical counter capacity is twice that of the horizontal counter for the same increment of resolution.

OR gate 99 and inverter 101 activate and de-activate an interpolating scheme to handle images whose vertical centroids fall between adjacent scan lines. The address number in the vertical address latch 95 is normally odd since the $2^0$ input from inverter 101 is normally "high." When a point occupies two scan lines, the readout logic circuit produces an interpolate pulse which is recognized by OR gate 99 and inverted in inverter 101 to remove the unit count from the input to latch 95. This reduces the address number by 1 so the event is stored as an even number indicating centroid location between two scan lines. The interpolate pulse is removed at the next clock interval, restoring the address to the previous odd condition where it remains for the remainder of the scan line unless another event requires interpolation. A four-line image also requiring interpolation is located in the same manner, except an additional one-scan line delay is provided by shift register 57.

Assuming now that the horizontal address counter 33 is set at the first position and the vertical address counter 103 is preset to the count 1018, as described above, the operation of the readout circuit of FIG. 1 will be described first referring to the storing of an event, such as event No. 1, on scan line No. 1 of FIG. 2. As the target is scanned along scan line No. 1, it encounters the event 1, as shown in FIG. 2. The signal from the television camera is differentiated by differentiator 39 to form a bipolar pulse, as shown in the timing diagram of FIG. 3. Its horizontal centroid is determined by the zero crossing point of the bipolar pulse, as described above. This pulse is applied to AND gate 43 along with a clock pulse from AND gate 25 which triggers one-shot 45. Since, as shown in FIG. 2, the event is within the number 8 horizontal increment area along the horizontal scan, 8 clock pulses have passed through AND gate 25 and the horizontal address is set at the No. 8 count and all of the shift registers have shifted 8 positions. The position pulse going from one-shot 45 is applied to the front bit in the shift register 49. As the scan continues, the bit is shifted through shift register 49 and during the next scan it is compared with the prompt signal output $\overline{A}$ in an AND gate 51. Since the $\overline{A}$ output of one-shot 45 is normally "high" and goes "low" when an image pulse is present, it will be "high" on the 2nd scan and AND gate 51 passes a pulse from shift register 49 to the input of AND gate 69. Since AND gate 69 is enabled at this point, it passes the pulse represented by $\overline{A}$, B, $\overline{C}$, during the scan to shift register 85. At time T2, which is the No. 8 increment along the third scan line of the television camera tube, there is an output at shift register 85 which is applied through OR gate 87 to the input of shift register 89. Shift register 89 delays the pulse one more horizontal scan time and at the fourth scan, T3, an output appears at shift register 89 which is applied through OR gate 91 and AND gate 93 to signal the horizontal and vertical latches 35 and 95, respectively, to sample the corresponding horizontal and vertical address numbers and hold this number until the next trigger pulse appears. The pulse from gate 93 also triggers the storage device to input the 9-bit horizontal address number held in latch 35 and the vertical address number held in latch 95.

Since the event actually was detected on scan line No. 1 and was delayed three scan line periods before initiation of the latches 35 and 95, the vertical address count must be corrected so that the latch 95 count input is at 1. This is accomplished by initially presetting the counter 103 to 1018 so that the count input to latch 95 is at 1019. Referring to FIG. 3, it will be seen that at the end of three scan periods the count to latch 95 is 1. The counter 103 is incremented by two each time the horizontal blanking pulse is applied to the count input and since its capacity is 9 binary bits, it will be seen that its count after three scan lines is zero, and the 1 count is represented by the output of inverter 101 connected to the $2^0$ input of latch 95. Thus, it will be seen from this example that the events 1, 3, and 5, illustrated in FIG. 2, whose centroids fall on a particular scan line are recorded essentially in the same manner. However, further delays are provided by the logic circuits, as illustrated in the timing diagram of FIG. 3, to properly address the memory for the centroid location along the vertical axis of the screen.

At T0 the signal first appears at the input to the shift register 49. After one scan line delay, time T1, the signal occurs at the input of shift register 53, and, if the necessary gates are satisfied, at the input of shift register 85. This condition is true only when the image occupies one scan line, as in the above example. At time T2 the signal occurs at the input of shift register 89. At time T3 the signal occurs at the output of shift register 89 and is stored, as shown in FIG. 3.

To further illustrate the operation of this system in a multiple delay for an event which overlaps four lines, for example, the following example describes the process by which the device detects the vertical center and stores the centroid address for event 4. Since this is a comparatively large image and has a vertical centroid falling between two scan lines, it illustrates several facets of the device.

Referring to FIG. 2, event 4 depicts a 4-scan line image on the camera target. It will be seen from FIG. 2 that the image crosses scan lines 10 through 13. To process this event image, the camera 19 sends the video information from scan line 10 to the differentiator 39 and the zero crossing discriminator 14. The pulse from the zero crossing discriminator 41 passes through AND gate 43 to the one-shot 45. The outputs of one-shot 45 at time T0 indicate the presence of the image on line 10. The output A is shifted through the series-connected shift registers 49 through 59. Each of the series-connected shift registers delays the video information by one scan line so that after four scan lines each part of the four line image appears at the output of the respective shift registers 49 through 57. The output of shift register 59 in this example is a 0 corresponding to no image on scan line 9. Since there is no signal on scan line 14 for this event, the $\overline{A}$ output of one-shot 45 is "high" and the B signal from shift register 49 is " high" indicating a signal image detected on scan line 13. This enables gate 51 giving the conditon $\overline{A}$, B into AND gate 69. Gate 69, however, is not satisfied since, in this example, a signal C (scan line 12) is present at the output of shift register 53 and inverted by inverter 61. Gate 77, however, is satisfied, giving condition $\overline{A}$, B, C into gate 71. Gate 71 is not satisfied, since in this example a signal D (scan line 11) is present and inverted by inverter 63. In like manner, the not condition from gate 51 propagates to gates 81 and 75. Since the output F (no signal on scan line 9) inverted in inverter 67 turns gate 75 on giving the output $\overline{A}$, B, C. D. E, $\overline{F}$. This output uniquely describes a four-line event (event 4) which is immediately preceded and followed by scan lines with no signal.

The four scan line image condition, $\overline{A}$, B, C. D, E, $\overline{F}$, at T4 provides a signal through OR gate 91 and AND gate 93 to trigger storing of event 4 by activating the horizontal and vertical latches 35 and 95, respectively, and the storage device 97. Simultaneously, the T4 output from gate 75 is applied to OR gate 99 and acting through inverter 101 reduces the count to the vertical address latch 95 by 1. Since the vertical address number for the centroid of event 4 is 22, reducing the count to latch 95 by 1 to the count 22 indicates that the image 4 centroid is located exactly between lines 11 and 12 corresponding to vertical address numbers 21 and 23, respectively, as shown in FIG. 3, recalling that the address number is twice the scan number.

Reviewing the storage for event 4, at T0 for the event 4, the signal first appears at the input to the shift register 49. After one delay time, time T1, the signal occurs at the output of shift register 49 and is applied to the input of shift register 53. Since the prompt signal $\overline{A}$ is low, at this point, gate 51 is not satisfied, and thus the pulse is not shifted through as in the example for an image on one scan line. At time T2, the signal occurs at the output of shift register 53 and is applied to the input of shift register 55. Since gate 51 is still disabled AND gate 77 at the output of shift register 53 is also disabled and the test period continues. At time T3 the signal appears at the output of shift register 55 and is applied to the input of shift register 57. Since AND gate 51 is still disabled, AND gate 79 connected to the output of shift register 55 is also disabled and the test continues. At time T4 the signal appears at the output of shift register 57. Since there is no prompt video signal at this time for event 4, $\overline{A}$ from one-shot 45 is high qualifying AND gate 51 which enables gate 77, gate 79, and gate 81, due to the fact that the signal is present at the outputs of registers 49, 53, 55, and 57. Inverters 61, 63, and 65, each have high inputs at this point which disables AND gates 69, 71, and 73. However, since the pulse is not present at the output of shift register 59, the output of inverter 67 is high enabling AND gate 75 to pass the $\overline{A}$, B, C, D, E, $\overline{F}$ signal at T4. Thus, at T4 the proper address is stored for the event 4, as described above. From the above discussion, it will be clearly understood from following FIG. 3 how the event addresses for events 2, 3, and 5 are stored.

While there has been shown and described what is considered a preferred embodiment of the invention, it will be understood that numerous modifications and additions thereto will be apparent to those skilled in the art. Accordingly, the above description and accompanying drawings should be taken as illustrative of the invention and not in a limiting sense.

What is claimed is:

1. In a television-based, two-dimensional radiation detection system wherein a target is scanned in a horizontal raster by a television camera to detect events generated by radiation impinging said target and producing an event image, said camera having an output for providing pulses corresponding to the detection of at least a portion of said event images as the camera target is scanned, the improvement comprising:

a plurality of series connected shift registers, each shift register having an identical number of bits equal to a selected incremental resolution along each horizontal scan line of said television camera;

pulse generating means responsive to said output pulses from said camera for generating a prompt signal coinciding with the horizontal centroid of the event images producing said pulses from said camera and applying said prompt signal to a first one of said series of shift registers by setting the front bit therein;

clock pulse generating means for synchronously shifting each of said shift registers at a clock rate corresponding to the horizontal scanning speed of said camera so that the set bit of said first register is continuously shifted through said pluarality of series-connected shift registers one at a time during horizontal scanning;

a presettable vertical address counter means for counting horizontal blanking pulses from said television camera from a preset number to register delayed vertical address numbers corresponding to the vertical centroid of event images as said scanning beam is shifted vertically along said target;

logic circuit means for sensing coincidence of set bit locations of said plurality of series-connected shift registers with said prompt signal output of said pulse generating means to determine the vertical extent of overlap of said event image of adjacent horizontal scans and generating a store command signal at an output thereof after said coincidence ceases at a time indicative of the centroid location of said event image registered by said counter;

a horizontal address counter means for counting pulses from said synchronous shifting means to register the horizontal address location of said scanning beam horizontally along each scan of said target; and storage means responsive to said store command signal from said logic circuit means for storing the delayed vertical address number registered by said vertical address counter indicative of the centermost one of said horizontal scans sensing an event image and storing the horizontal address number registered by said horizontal address counter indicative of the horizontal centroid location of said event image.

2. The system as set forth in claim 1 wherein said vertical address counter has a capacity twice the number of horizontal scan lines and further including interpolation circuit means responsive to the output of said logic circuit means for normally maintaining an odd numbered vertical address for each scan line counted by said vertical address counter means and reducing the count by one to an even numbered address when the vertical centroid of an image is located between adjacent horizontal scan lines.

3. The system as set forth in claim 2 wherein said pulse generating means includes a signal differentiating circuit connected to the video output of said camera which produces a bipolar pulse crossing the zero potential level at a horizontal scan time corresponding to the horizontal centroid of a detected event image along a horizontal scan, a zero crossing detector connected to the output of said differentiator circuit for providing a pluse coincident with the time said bipolar pulse crosses the zero potential level, and a one-shot multivibrator connected to the output of said zero crossing detector, said one-shot having a first output which is normally "high" and a second output which is normally "low," said first output connected to an input of said logic circuit means and said second output connected to set the front bit of said first one of said plurality of series connected shift registers.

4. The system as set forth in claim 3 wherein said logic circuit means includes a plurality of normally disabled gating means coupled to respective outputs of said plurality of series-connected shift registers for enabling one of said gating means to pass a pulse at a respective output corresponding to the extent of scan line overlap of an event image determined by the number of said plurality of shift registers said set bit corresponding to the first scan line detecting the event is shifted before said coincidence ceases, and output circuit means for selectively delaying outputs from selected ones of said gating means for different periods, each period equal to one horizontal scan time so that said store command signal coincides with the delayed vertical address count corresponding to the vertical centroid of a detected even image.

* * * * *